(12) United States Patent
Byun

(10) Patent No.: US 12,370,993 B2
(45) Date of Patent: Jul. 29, 2025

(54) FRONT MOUNTED-TYPE RESERVOIR ASSEMBLY

(71) Applicant: HL MANDO CORPORATION, Gyeonggi-do (KR)

(72) Inventor: Seunghwan Byun, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 29 days.

(21) Appl. No.: 18/204,006

(22) Filed: May 31, 2023

(65) Prior Publication Data

US 2023/0382362 A1 Nov. 30, 2023

(30) Foreign Application Priority Data

May 31, 2022 (KR) ........................ 10-2022-0066514

(51) Int. Cl.
| | |
|---|---|
| B60T 17/06 | (2006.01) |
| B60T 11/26 | (2006.01) |
| B60T 13/14 | (2006.01) |
| B60T 17/22 | (2006.01) |
| F16D 25/12 | (2006.01) |

(52) U.S. Cl.
CPC .............. B60T 17/06 (2013.01); B60T 11/26 (2013.01); B60T 13/14 (2013.01); *B60T 13/142* (2013.01); *B60T 17/225* (2013.01); *B60Y 2400/81* (2013.01); *F16D 25/12* (2013.01)

(58) Field of Classification Search
CPC ........ B60T 17/06; B60T 17/225; B60T 11/26; B60T 13/142; B60T 13/14; B60Y 2400/81; F16D 25/12

USPC .................. 137/351, 590, 582, 573; 251/127
See application file for complete search history.

(56) References Cited

U.S. PATENT DOCUMENTS 4,355,512 A * 10/1982 Kubota .................... B60T 11/26
 60/534
4,385,495 A * 5/1983 Kubota ................. B60T 17/225
 60/592

(Continued)

FOREIGN PATENT DOCUMENTS

| DE | 10233350 | 2/2004 |
| DE | 102019107334 | 8/2020 |

(Continued)

OTHER PUBLICATIONS

Office Action dated Apr. 4, 2025 for Korean Patent Application No. 10-2022-0066514 and its English translation provided by Applicant's foreign counsel.

*Primary Examiner* — Minh Q Le
(74) *Attorney, Agent, or Firm* — WOMBLE BOND DICKINSON (US) LLP

(57) ABSTRACT

Disclosed herein is a front mounted-type reservoir assembly installed on a front surface of a hydraulic block of an integrated dynamic brake system including a main reservoir tank that is provided with a main reservoir chamber that stores brake oil therein, and a plurality of oil ports, through which the brake oil flows in and out, on a front surface of the main reservoir tank, wherein at least one partition wall is provided in the main reservoir tank to partition the main reservoir chamber into a plurality of regions, and at least one separation wall is provided in at least one of the plurality of partitioned reservoir chambers to increase flow resistance of the brake oil.

18 Claims, 10 Drawing Sheets

(56) References Cited

U.S. PATENT DOCUMENTS

| | | | | | |
|---|---|---|---|---|---|
| 4,514,980 | A | * | 5/1985 | Ishiwata | B60T 11/26 60/592 |
| 4,938,247 | A | * | 7/1990 | Yandle, II | B61D 5/06 137/590 |
| 5,743,093 | A | * | 4/1998 | Nakayoku | B60T 11/26 60/585 |
| 6,105,611 | A | * | 8/2000 | Ando | B60T 11/26 137/574 |
| 2010/0231031 | A1 | * | 9/2010 | Takahashi | B60T 11/26 303/5 |
| 2019/0084541 | A1 | * | 3/2019 | Sekine | B60T 17/06 |
| 2019/0366995 | A1 | | 12/2019 | Sakakibara | |
| 2022/0410858 | A1 | * | 12/2022 | Yoo | B60T 11/26 |
| 2022/0410859 | A1 | * | 12/2022 | Freund | B60T 17/222 |
| 2023/0192052 | A1 | * | 6/2023 | Park | B60T 11/26 60/585 |
| 2023/0356702 | A1 | * | 11/2023 | Cho | B60T 11/26 |

FOREIGN PATENT DOCUMENTS

| | | |
|---|---|---|
| JP | 2000-255410 | 9/2000 |
| JP | 2017-47713 | 3/2017 |
| JP | 2017-222202 | 12/2017 |
| JP | 2018-118659 | 8/2018 |

\* cited by examiner

FRONT MOUNTED-TYPE RESERVOIR ASSEMBLY

CROSS-REFERENCE TO RELATED APPLICATION

This application claims the benefit of Korean Patent Application No. 10-2022-0066514, filed on May 31, 2022, in the Korean Intellectual Property Office, the disclosure of which is incorporated herein by reference.

BACKGROUND

1. Field

Embodiments of the present disclosure relate to a front mounted-type reservoir assembly, and more specifically, to a front mounted-type reservoir assembly which is mounted on a front surface of a hydraulic block so as to supply brake oil to an integrated dynamic brake system.

2. Description of the Related Art

A brake system for performing braking is essentially installed on a vehicle, and various types of brake systems have been proposed for the safety of drivers and passengers.

In a conventional brake system, when a driver depresses a brake pedal, hydraulic pressure for braking is supplied to wheel cylinders using a booster mechanically connected to the brake pedal. However, due to the increased market demands for various braking functions in a detailed response to the operating environment of the vehicle, an integrated dynamic brake (IDB) system, which receives an electrical signal as the driver's intention to brake from a pedal displacement sensor that detects a displacement of a brake pedal when the driver depresses the brake pedal, and operates a hydraulic pressure generator based on the electrical signal to supply hydraulic pressure required for braking to wheel cylinders, have been widely used in recent years.

The IDB system makes it possible to generate a stable and powerful braking force by integrating a master booster and an electronic stability control (ESC). This IDB system generally includes a configuration in which a motor is operated by outputting the operation of a brake pedal as an electrical signal through a pedal displacement sensor, a piston pump of a hydraulic pressure generator generates braking hydraulic pressure by the operation of the motor, and the hydraulic pressure is controlled by an electronic control unit to be transmitted to each wheel. In addition, a master cylinder is provided in a hydraulic block having a hydraulic circuit so as to directly transmit a pedal effort of a brake pedal to the wheel cylinder when the system is abnormally operated.

A reservoir for providing brake oil to the IDB system is provided so as to perform braking through the IDB system. Typically, the reservoir stores brake oil therein and is coupled to the upper portion of the master cylinder. In addition, the reservoir may be connected to the piston pump so as to generate the hydraulic pressure by the piston pump provided in the hydraulic pressure generator of the IDB system.

Although the reservoir is installed in various ways in order to supply brake oil to the IDB system, there is a limitation in that it is difficult to install the reservoir in a limited space of a vehicle.

In addition, there occurs a limitation in that when air is exposed to an oil port of the reservoir through which brake oil flows in and out under the conditions of the driving and a partially braking of a vehicle, air is introduced into the brake system, thereby deteriorating a sense of pedaling and brake performance.

SUMMARY

Therefore, it is an aspect of the present disclosure to provide a front mounted-type reservoir assembly that facilitates installation in a limited space by providing divided reservoirs and being installed on the front of an integrated dynamic brake system.

It is another aspect of the present disclosure to provide a front mounted-type reservoir assembly capable of preventing air from flowing into the brake system by increasing flow resistance by providing partition walls in a reservoir chamber connected to an oil port to which air is exposed.

It is still another aspect of the present disclosure to provide a front mounted-type reservoir assembly capable of preventing the deterioration in a sense of pedaling and brake performance by preventing air from flowing into a brake system through an oil port.

In accordance with one aspect of the present disclosure, a front mounted-type reservoir assembly installed on a front surface of a hydraulic block of an integrated dynamic brake system includes a main reservoir tank that is provided with a main reservoir chamber that stores brake oil therein, and a plurality of oil ports, through which the brake oil flows in and out, on a front surface of the main reservoir tank. At least one partition wall is provided in the main reservoir tank to partition the main reservoir chamber into a plurality of regions, and at least one separation wall is provided in at least one of the plurality of partitioned reservoir chambers to increase flow resistance of the brake oil.

The plurality of oil ports may be provided to be connected to the plurality of partitioned reservoir chambers, respectively.

The separation wall may be provided in plural and arranged in a zigzag shape.

The separation wall may include a first separation wall having one end fixed to an inner wall of the main reservoir tank and the other end extending to the partition wall, and a second separation wall having one end fixed to the partition wall and the other end extending to the inner wall. The first separation wall and the second separation wall may allow the brake oil to be guided along the first separation wall and the second separation wall in a zigzag shape and to flow to the oil ports.

The first separation wall and the second separation wall may be provided in plural.

The first separation wall and the second separation wall may vertically extend from a bottom surface of the main reservoir tank.

The partition wall may include a first partition wall and a second partition wall which are provided to be spaced apart from each other by a certain distance. The main reservoir chamber may include a first main reservoir chamber formed between an inner wall of the main reservoir tank and the first partition wall, a second main reservoir chamber formed between the inner wall of the main reservoir tank and the second partition wall, and a third main reservoir chamber formed between the first partition wall and the second partition wall. The plurality of oil ports may include a first oil port that communicates with the first main reservoir chamber, a second oil port that communicates with the second main reservoir chamber, and a third oil port that communicates with the third main reservoir chamber.

The partition wall may vertically extend from the bottom surface of the main reservoir tank, and an opening may be formed in a certain portion of the partition wall.

The opening may vertically extend to communicate with the neighboring main reservoir chamber, and a lower side of the opening may be provided to prevent the brake oil stored in each of the main reservoir chambers from moving to the neighboring main reservoir chambers.

The front mounted-type reservoir assembly may further include a float that moves up and down according to the level of the brake oil to measure a residual flow rate of the brake oil stored in the main reservoir chamber, and a float guide that guides the up and down movement of the float.

The front mounted-type reservoir assembly may further include an oil detector provided at a lower end of the float.

A first connection port may be provided in the main reservoir tank to receive the brake oil.

The front mounted-type reservoir assembly may further include a remote reservoir tank provided with an oil inlet for introducing the brake oil, a second connection port for supplying the brake oil to the main reservoir tank, and a remote reservoir chamber that stores the brake oil therein, and a connection member that connects the first connection port and the second connection port to transmit the brake oil in the remote reservoir tank to the main reservoir chamber.

A guide wall may be provided in the remote reservoir tank to increase the flow resistance of the brake oil guided to the second connection port.

The guide wall may vertically extend from a bottom surface of the remote reservoir tank.

The guide wall may include a first guide separation wall formed in a direction corresponding to a longitudinal direction of the second connection port, and a second guide separation wall provided between the first guide separation wall and an inner wall of the remote reservoir tank in a direction perpendicular to the first guide separation wall.

The first guide separation wall may be provided in a pair and arranged to be spaced apart from each other by a certain distance, and the second guide separation wall may be provided in plural and arranged in a zigzag shape.

The second guide separation wall may have one end extending to the inner wall in the case of the other end fixed to the first guide separation wall, have one end extending to the first guide separation wall in the case of the other end fixed to the inner wall, and may allow the brake oil to flow in a zigzag shape along the second guide separation wall.

A flow hole may be formed in the first guide separation wall to allow a flow of the brake oil stored between the first guide separation wall and the inner wall.

The bottom surface of the remote reservoir tank may be provided with a flat section and an inclined section, the inclined section may be provided to be inclined so that the brake oil flows to the flat section, and the guide wall may be disposed in the flat section.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
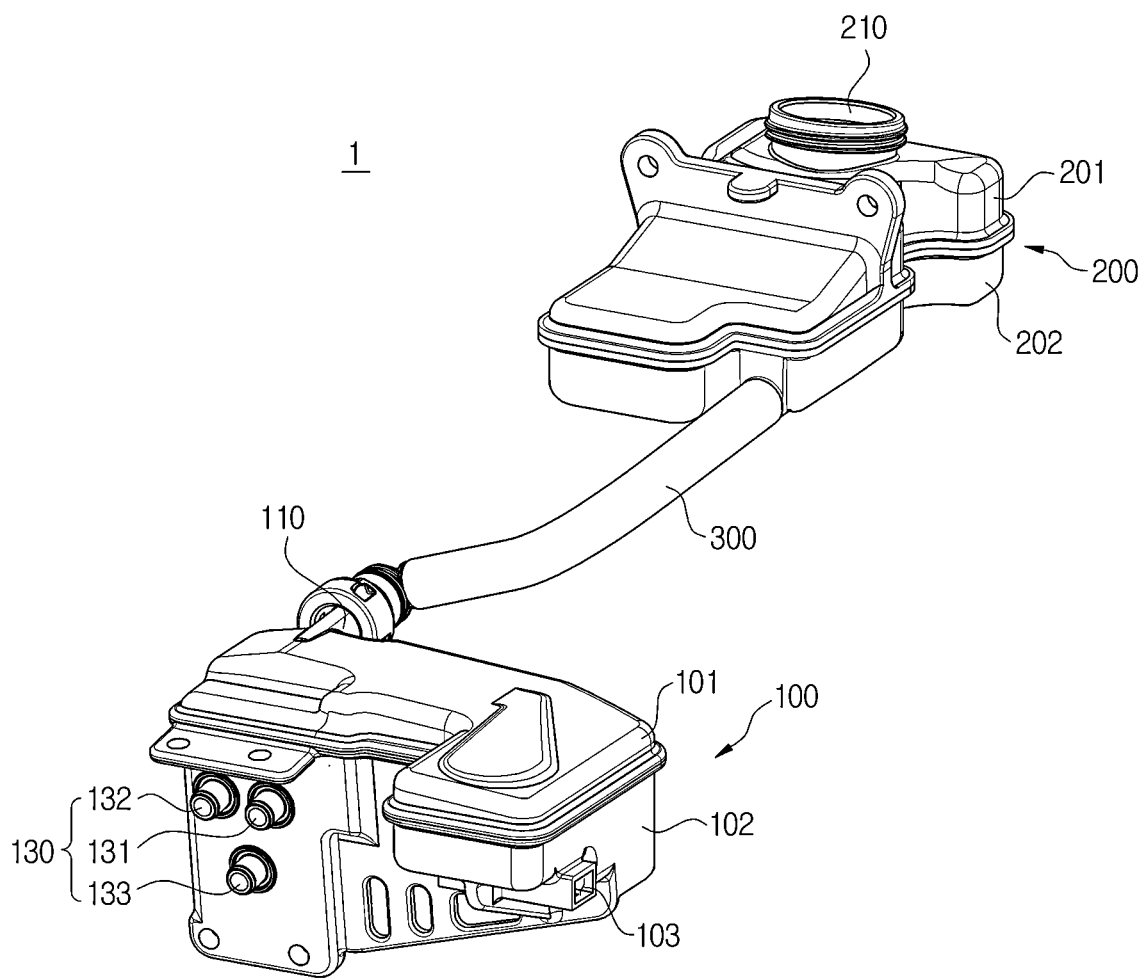
FIG. 1 is a perspective view illustrating a front mounted-type reservoir assembly according to an embodiment of the present disclosure.

Hereinafter, embodiments of the present disclosure will be described in detail with reference to the accompanying drawings. The following embodiments are provided to fully convey the spirit of the disclosure to a person having ordinary skill in the art to which the present disclosure belongs. The present disclosure is not limited to the embodiments disclosed herein but may be embodied in other forms. In the drawings, some portions not related to the description will be omitted and will not be shown in order to clearly describe the present disclosure, and also a size of a component may be somewhat exaggerated to help understanding.

Figure 2:
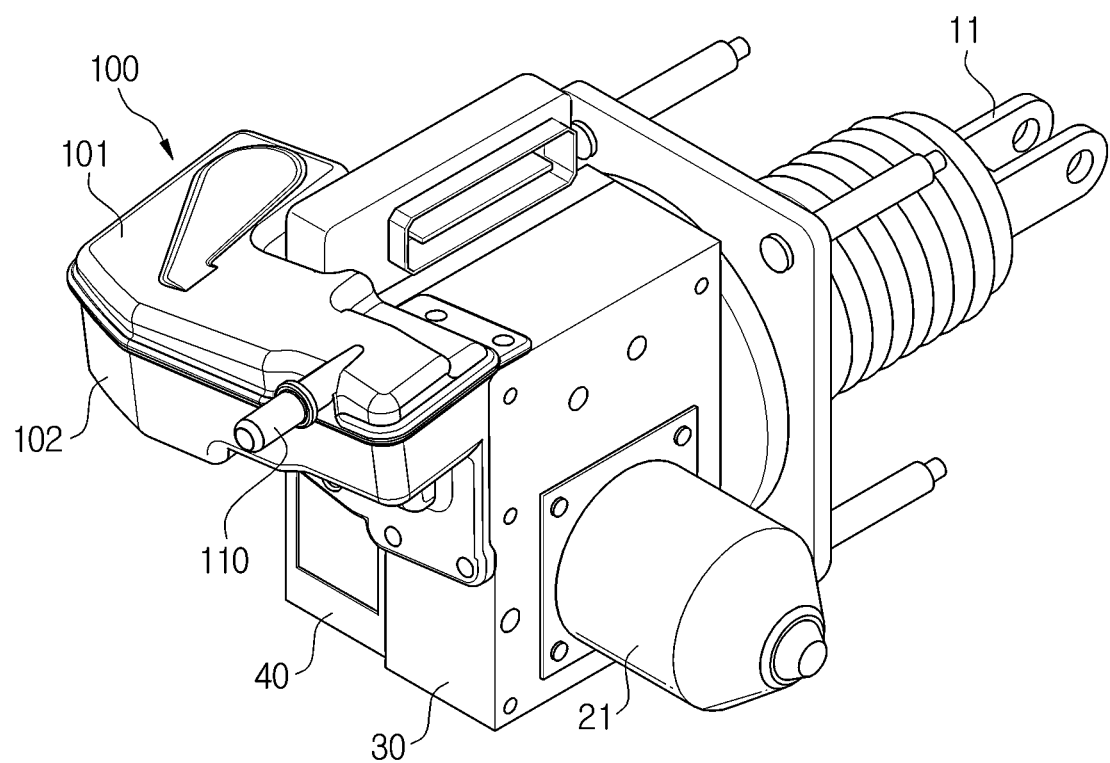
FIG. 2 is a perspective view illustrating a state in which a main reservoir tank of the front mounted-type reservoir assembly according to the embodiment of the present disclosure is mounted on a front surface of a hydraulic block of an integrated dynamic brake system.

FIG. 1 is a perspective view illustrating a front mounted-type reservoir assembly according to an embodiment of the present disclosure, and FIG. 2 is a perspective view illustrating a state in which a main reservoir tank of the front mounted-type reservoir assembly according to the embodiment of the present disclosure is mounted on a front surface of a hydraulic block of an integrated dynamic brake system.

Referring to FIGS. 1 and 2, the front mounted-type reservoir assembly 1 according to the embodiment of the present disclosure may include the main reservoir tank 100 provided with a plurality of oil ports 130, and a remote reservoir tank 200 connected to the main reservoir tank 100. In this case, the main reservoir tank 100 may be mounted on the front surface of the hydraulic block 30 so as to provide brake oil to the integrated dynamic brake system. Before describing the configuration of the front mounted-type reservoir assembly 1, the integrated dynamic brake system coupled to the main reservoir tank 100 will be briefly described.

In general, the integrated dynamic brake system may include a master cylinder (not shown) connected to a brake pedal, a hydraulic pressure generator (not shown) that generates hydraulic pressure by measuring a displacement of the brake pedal, a hydraulic block 30 having a plurality of flow paths processed so that the hydraulic pressure generated from the master cylinder or the hydraulic pressure generator is transmitted to wheel cylinders, and an electronic control unit 40 that controls a flow of the hydraulic pressure. In this case, in the hydraulic block 30, the master cylinder and a piston pump of the hydraulic pressure generator may be provided to be connected to the flow paths. In addition, solenoid valves are provided at a suitable position in the plurality of flow paths to selectively allow a flow of the brake oil. Accordingly, the electronic control unit 40 controls the flow of the hydraulic pressure transmitted to the wheel cylinders by adjusting each of the solenoid valves, and performs the braking operation.

This integrated dynamic brake system is a well-known technology that has already been widely known, and a detailed description thereof will be omitted.

Meanwhile, unexplained reference numeral '11' indicates a clevis of which one end is connected to an input rod and the other end is connected to the brake pedal in order to pressurize the master cylinder, and reference numeral '21' indicates a motor for operating the piston pump of the hydraulic pressure generator.

Figure 3:
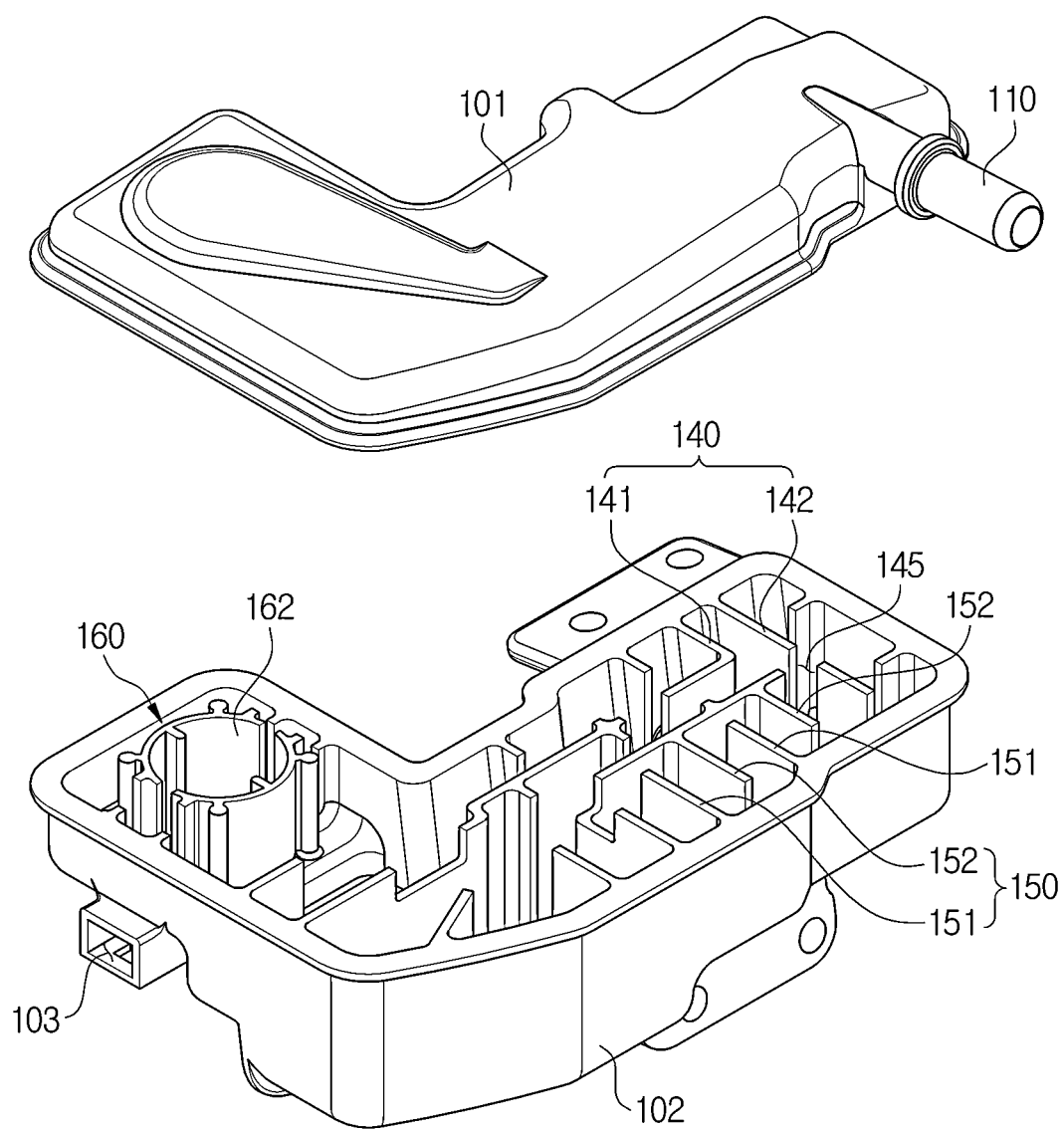
FIG. 3 is an exploded perspective view illustrating the main reservoir tank of the front mounted-type reservoir assembly according to the embodiment of the present disclosure.
Figure 4:
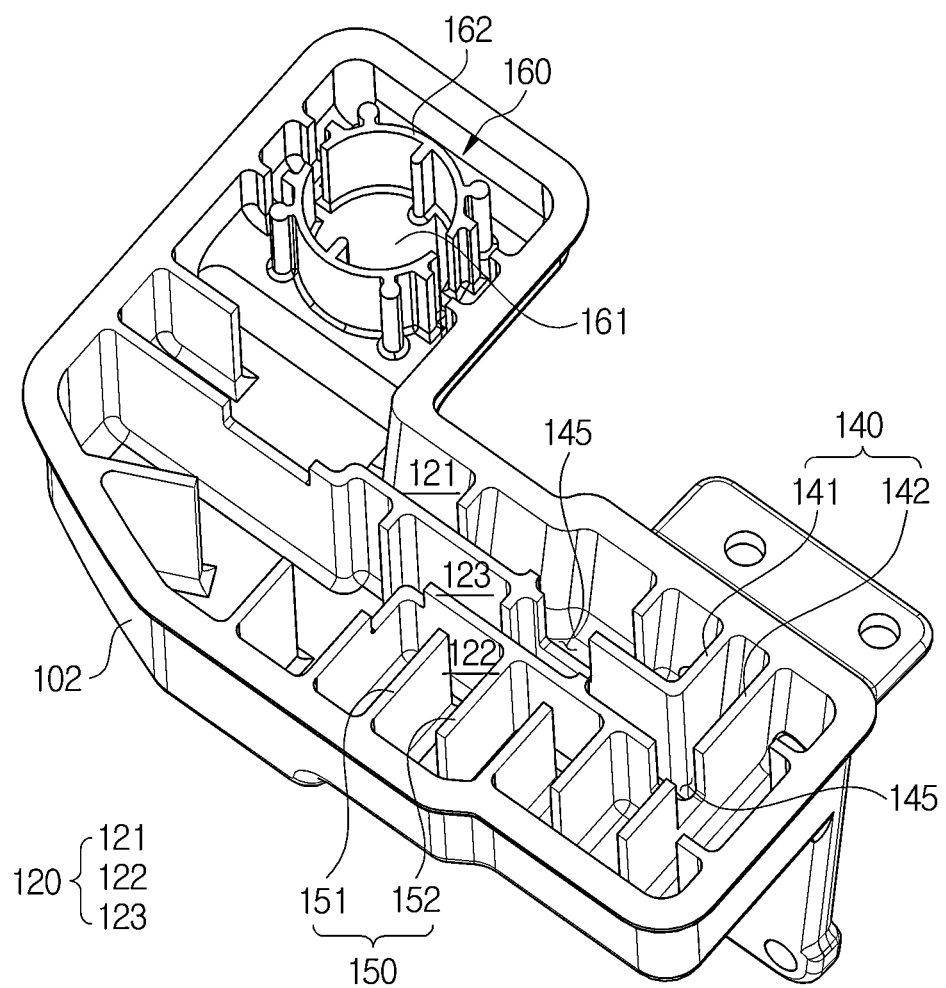
FIG. 4 is a plan view illustrating the inside of the main reservoir tank of FIG. 3.
Figure 5:
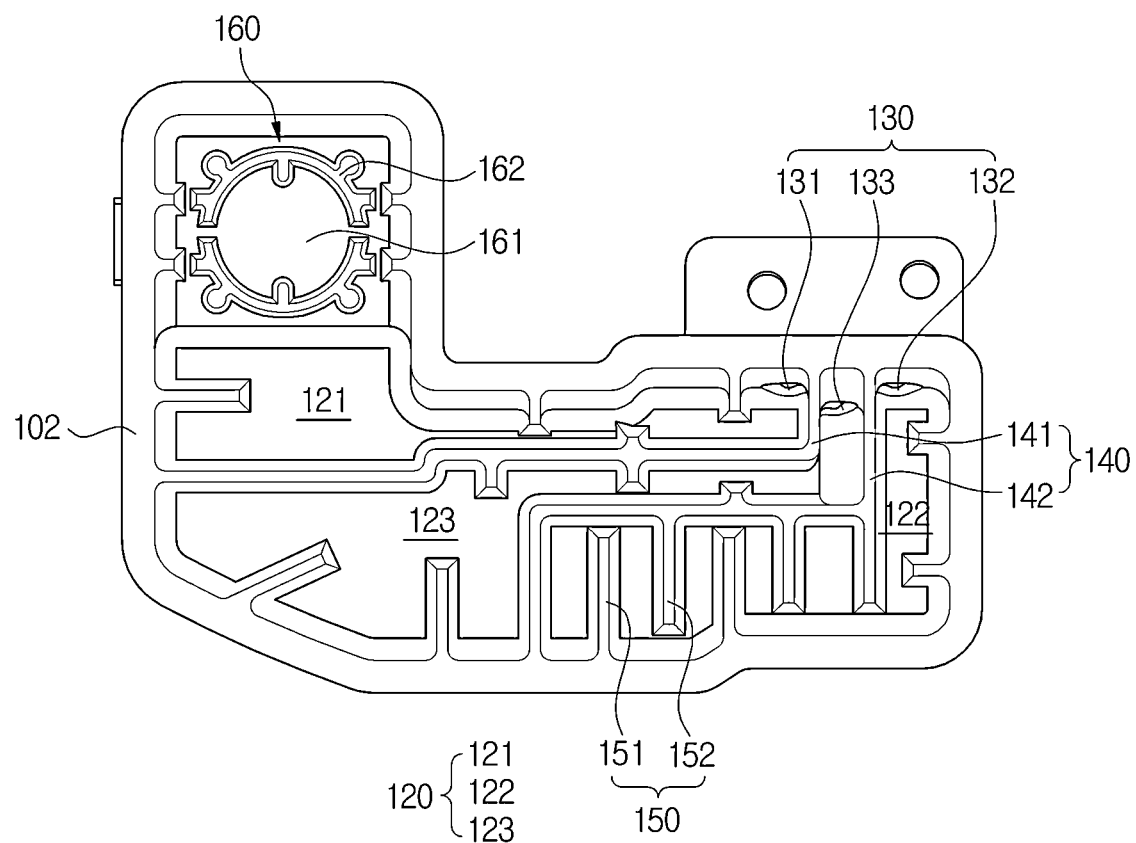
FIG. 5 is a perspective view illustrating a main lower body according to the embodiment of the present disclosure at a different angle.
Figure 6:
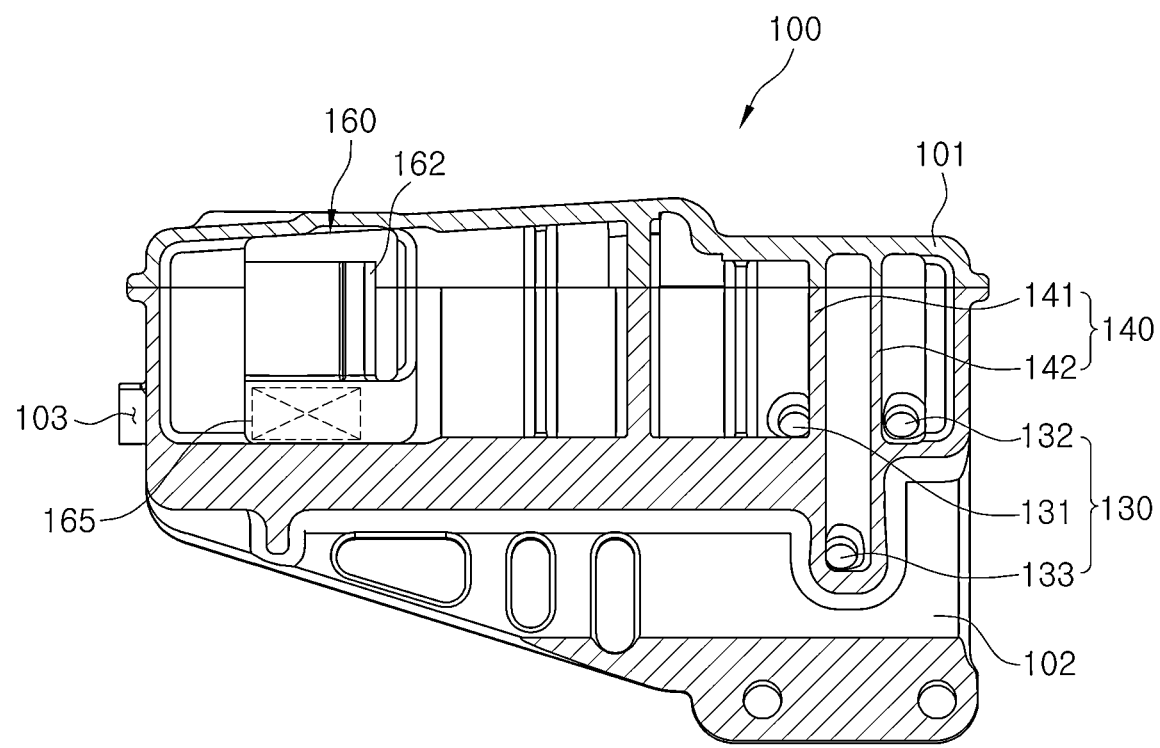
FIG. 6 is a front cross-sectional view illustrating the main reservoir tank of the front mounted-type reservoir assembly according to the embodiment of the present disclosure.
Figure 7:
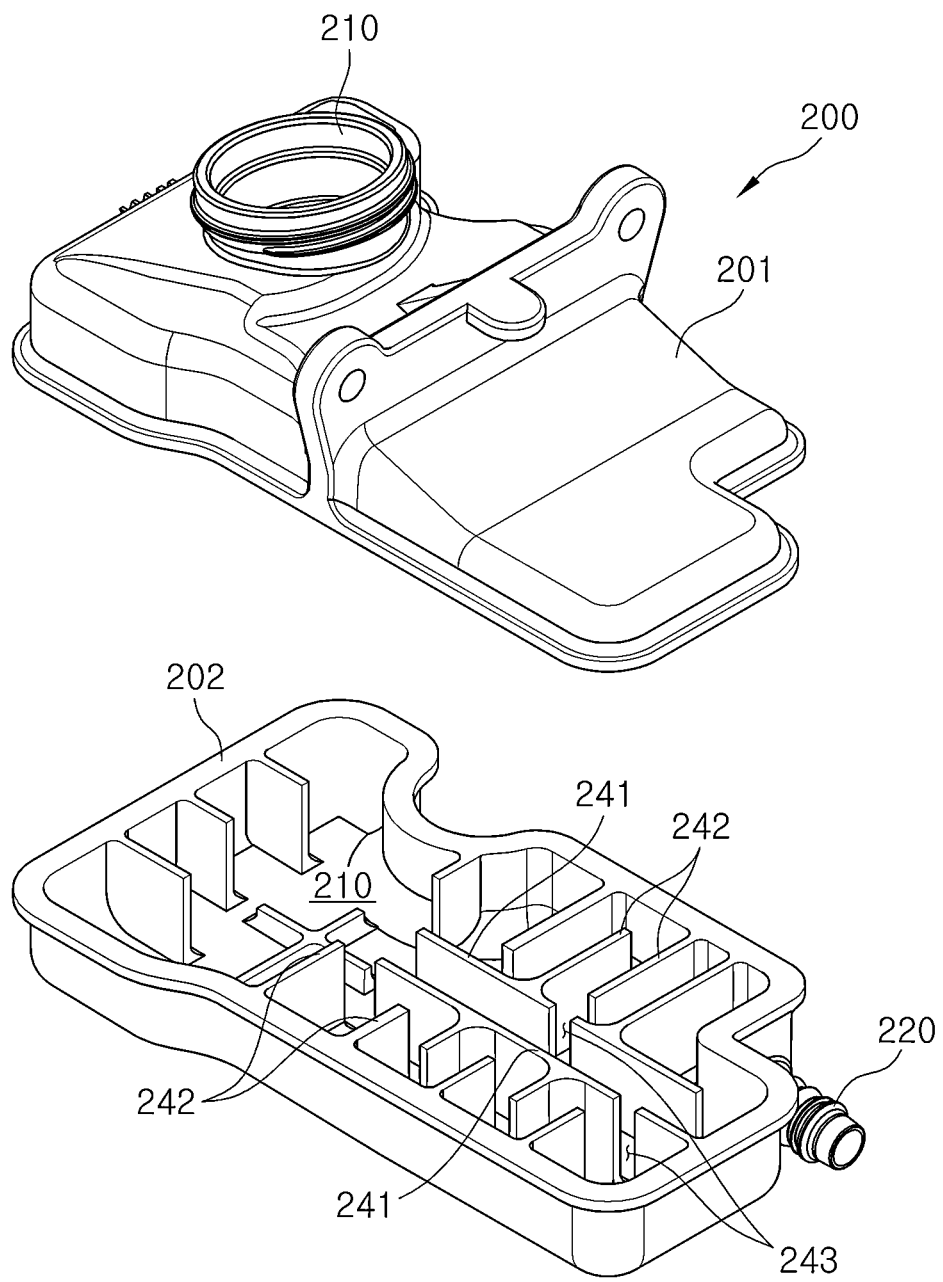
FIG. 7 is an exploded perspective view illustrating a remote reservoir tank of the front mounted-type reservoir assembly according to the embodiment of the present disclosure.
Figure 8:
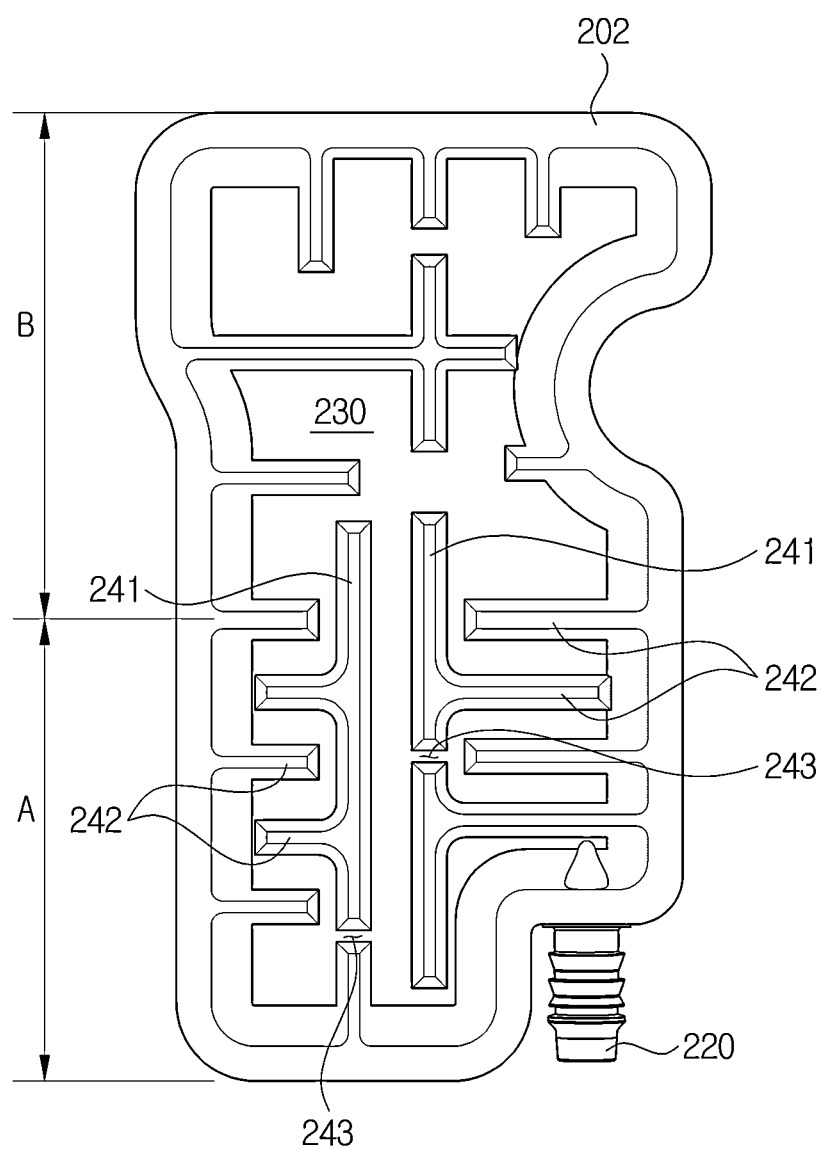
FIG. 8 is a plan view illustrating the inside of the remote reservoir tank of FIG. 7.
Figure 9:
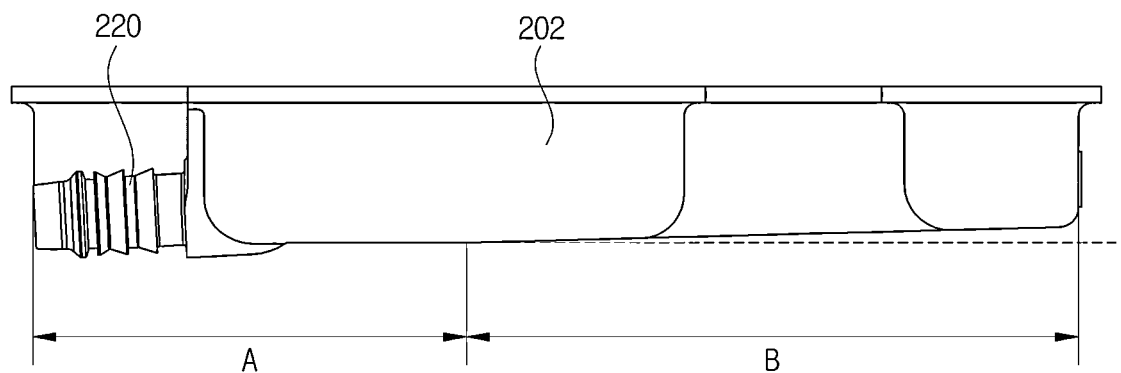
FIG. 9 is a side view illustrating the remote reservoir tank of FIG. 8.

FIG. 3 is an exploded perspective view illustrating the main reservoir tank of the front mounted-type reservoir assembly according to the embodiment of the present disclosure, FIG. 4 is a plan view illustrating the inside of the main reservoir tank of FIG. 3, FIG. 5 is a perspective view illustrating a main lower body according to the embodiment of the present disclosure at a different angle, FIG. 6 is a front cross-sectional view illustrating the main reservoir tank of the front mounted-type reservoir assembly according to the embodiment of the present disclosure, FIG. 7 is an exploded perspective view illustrating a remote reservoir tank of the front mounted-type reservoir assembly according to the embodiment of the present disclosure, FIG. 8 is a plan view illustrating the inside of the remote reservoir tank of FIG. 7, and FIG. 9 is a side view illustrating the remote reservoir tank of FIG. 8.

Referring to FIGS. 1 to 9, the main reservoir tank 100 according to the present disclosure may be mounted on the front surface of the hydraulic block 30 so as to supply brake oil to the master cylinder and the piston pump.

The main reservoir tank 100 is provided with a main reservoir chamber 120 that stores the brake oil therein. The main reservoir chamber 120 is a space formed inside when a main upper body 101 and a main lower body 102 of the main reservoir tank 100 are coupled to each other. Accordingly, the main reservoir chamber 120 may store the brake oil supplied to the integrated dynamic brake system.

The main reservoir tank 100 may be provided with a first connection port 110 formed to receive brake oil from the remote reservoir tank 200, which will be described later, and a plurality of oil ports 130 coupled to the front surface of the hydraulic block 30 to supply the brake oil.

The first connection port 110 may be integrally provided with the main upper body 101, and the plurality of oil ports 130 may be integrally provided with the main lower body 102.

The main upper body 101 and the main lower body 102 may be thermally fused to each other to constitute a single body.

The first connection port 110 may be connected to the remote reservoir tank 200 through a connection member 300. The structure connected through the connection member 300 will be described again below.

As illustrated, the plurality of oil ports 130 may include first to third oil ports 131, 132, and 133. For example, the first oil port 131 and the second oil port 132 may be respectively connected to a first hydraulic pressure chamber (not shown) and a second hydraulic pressure chamber (not shown) formed in the master cylinder, and the third oil port 133 may be connected to a piston pump hydraulic pressure chamber (not shown) of the hydraulic pressure generator. Such a structure to which the first to third oil ports 131, 132, and 133 are connected is an example, but is not limited thereto. That is, the first and third oil ports 131 and 133 may be connected to the master cylinder, or the second and third oil ports 132 and 133 may be connected to the master cylinder.

At least one partition wall 140 may be provided in the main reservoir tank 100 to partition the main reservoir chamber 120 into a plurality of regions. In this case, the main reservoir chamber 120 may be partitioned to supply the brake oil to two hydraulic pressure chambers of the master cylinder and one hydraulic pressure chamber of the hydraulic pressure generator.

More specifically, the partition wall 140 may be provided to partition the main reservoir chamber 120 into first to third reservoir chambers 121, 122, and 123. That is, as illustrated, the partition wall 140 may include a first partition wall 141 and a second partition wall 142. The first partition wall 141 and the second partition wall 142 may be formed to be spaced apart from each other by a certain distance. Accordingly, the main reservoir chamber 120 may include a first main reservoir chamber 121 formed between the inner wall of the main reservoir tank 100 and the first partition wall 141, a second main reservoir chamber 122 formed between the inner wall of the main reservoir tank 100 and the second partition wall 142, and a third main reservoir chamber 123 formed between the first partition wall 141 and the second partition wall 142.

As the main reservoir chamber 120 is partitioned into the first to third main reservoir chambers 121, 122, and 123, the first oil port 131 may be provided to communicate with the first main reservoir chamber 121, the second oil port 132 may be provided to communicate with the second main reservoir chamber 122, and the third oil port 133 may be provided to communicate with the third main reservoir chamber 123. Accordingly, the brake oil stored in each of the main reservoir chambers 121, 122, and 123 may flow in and out through each of the oil ports 131, 132, and 133.

This partition wall 140 may vertically extend from a bottom surface of the main reservoir tank 100. In this case, openings 145 may be formed in a certain portion of the partition wall 140. That is, openings 145 may be formed in the first partition wall 141 and the second partition wall 142, respectively.

The openings 145 may vertically extend on the partition wall 140. The openings 145 may be provided to communicate with neighboring main reservoir chambers 121, 122, and 123. That is, the first main reservoir chamber 121 may communicate with the third main reservoir chamber 123 through the opening 145 formed in the first partition wall 141. In addition, the second main reservoir chamber 122 may communicate with the third main reservoir chamber 123 through the opening 145 formed in the second partition wall 142. Accordingly, the first to third main reservoir chambers 121, 122, and 123 may be connected to each other through the openings 145.

However, a lower side of the opening 145 may be provided to prevent the brake oil stored in each of the main reservoir chambers 121, 122, and 123 from moving to the neighboring main reservoir chambers 121, 122, and 123. That is, as illustrated in FIG. 4, a lower portion of the partition wall 140 is provided to protrude from the bottom surface of the main reservoir tank 100 by a predetermined length, such that a certain amount of the brake oil stored in the first to third main reservoir chambers 121, 122, and 123 is not moved to the other main reservoir chambers 121, 122, and 123. This is to provide a minimum amount of brake oil to any one among the plurality of main reservoir chambers 121, 122, and 123 so that the brake oil may perform a braking operation when the brake oil leaks due to damage to or a coupling fault of the main reservoir tank 100.

According to an aspect of the present disclosure, a separation wall 150 may be provided in at least one among the plurality of main reservoir chambers 121, 122, and 123 to increase flow resistance of the brake oil. This is because air is severely exposed to the oil ports 130 under the conditions of the driving and some braking of the vehicle, such that the air may be introduced into the brake system. For example, air is present in the main reservoir tank 100 together with the brake oil. Accordingly, when rotation occurs under an acceleration condition or when a sudden braking is required, the brake oil is rapidly discharged through the oil ports 130, and thus the possibility of air flowing into the brake oil is increased. Therefore, in order to prevent the brake oil from being rapidly discharged through the oil ports 130, the separation wall 150 is provided so as to increase the flow resistance of the brake oil.

This separation wall 150 may be provided in plural and arranged in a zigzag shape. More specifically, the separation wall 150 may include a first separation wall 151 having one end fixed to the inner wall of the main reservoir tank 100 and the other end extending to the partition wall 140, and a second separation wall 152 having one end fixed to the partition wall 140 and the other end extending to the inner wall. As illustrated, the separation wall 150 is formed in the second main reservoir chamber 122, but is not limited thereto, and may be formed in the first main reservoir chamber 121 or the third main reservoir chamber 123, or may be formed in two or more main reservoir chambers. Preferably, the separation wall 150 may be provided in the main reservoir chambers 121, 122, and 123 connected to the oil ports 131, 132, and 133 to which air is exposed through an experiment.

The first separation wall 151 and the second separation wall 152 may be provided in plural, and may vertically extend from the bottom surface of the main reservoir tank 100. Accordingly, the first separation wall 151 and the second separation wall 152 may allow the brake oil to be guided in a zigzag shape along the first separation wall 151 and the second separation wall 152 and to flow to the second oil port 132.

The separation wall 150 and the partition wall 140 may be integrally formed by being molded together when the main reservoir tank 100 is molded. Accordingly, the separation wall 150 and the partition wall 140 are formed in a vertical direction.

Meanwhile, although reference numerals are not added, additional separation walls may also be provided in the first main reservoir chamber 121 and the third reservoir chamber 123. Through this additional separation wall, it is possible to reduce oil fluidity caused by vibration or sloshing during the driving of vehicle.

In addition, the partition wall 140 and the separation wall 150 described above may be formed in the main lower body 102, and a partition wall and a separation wall may also be provided in portions corresponding to the partition wall 140 and the separation wall 150 in the main upper body 101.

A float part 160 may be provided inside the main lower body 102. The float part 160 may include a float 161 that moves up and down according to the level of oil in the main reservoir chamber 120 in order to measure a residual flow rate in the main reservoir chamber 120, a float guide 162 that guides the up and down movement of the float 161, and an oil detector 165 provided below the float 161.

The float guide 162 may be provided in the main reservoir tank 100 in the vertical direction, the float 161 may be provided inside the float guide 162 to vertically move according to the amount of oil, and the oil detector 165 may be accommodated in an accommodation part 103 formed in the main lower body 102. An oil sensor in the oil detector 165 may be accommodated in the accommodation part 103 to sense whether the oil liquid level between the float 161 and the oil detector 165 is equal to or lower than a predetermined level.

When a large amount of brake oil is in the main reservoir tank 100, the float 161 has a density less than the oil, and thus the float 161 floats on the upper surface of the oil and moves upwards, thereby being far from the oil detector 165. When the amount of brake oil decreases and the level of oil is lowered, the float 161 also moves downward to be closer to the oil detector 165. In this case, when the amount of oil between the float 161 and the oil detector 165 is reduced due to the decrease in the oil liquid level in the main reservoir tank 100, and thus the distance between the float 161 and the oil detector 165 is equal to or less than a predetermined level, the detecting sensor may detect this, thus warning the driver by turning on a warning light on an internal display of the vehicle.

The remote reservoir tank 200 may be provided to supply oil to the main reservoir tank 100. Accordingly, the remote reservoir tank 200 may be provided to be spaced apart from the upper side of the main reservoir tank 100 by a certain distance.

The remote reservoir tank 200 may include an oil inlet 210 for introducing the brake oil and a second connection port 220 for supplying the brake oil to the main reservoir tank 100. In addition, the remote reservoir tank 200 is provided with a remote reservoir chamber 230 that stores brake oil therein. The remote reservoir chamber 230 is a space formed inside when a remote upper body 201 and a remote lower body 202 of the remote reservoir tank 200 are coupled to each other. Accordingly, the remote reservoir chamber 230 may store the brake oil supplied to the main reservoir tank 100.

The oil inlet 210 may be provided in the remote upper body 201, and the second connection port 220 may be provided in the remote lower body 202. The remote upper body 201 and the remote lower body 202 may be thermally fused to each other to be integrated.

The oil inlet 210 is formed on an upper side of the remote upper body 201, and the brake oil is introduced through the oil inlet 210. In this case, a cap for preventing leakage of the brake oil to the outside may be installed on the oil inlet 210.

The second connection port 220 may be integrally formed with the remote lower body 202. The second connection port 220 may be connected to the first connection port 110 through the connection member 300. In this case, since the remote reservoir tank 200 is provided at a position higher than that of the main reservoir tank 100, the brake oil may be easily transmitted to the main reservoir tank 100.

One end of the connection member 300 is connected to the first connection port 110 and the other end thereof is connected to the second connection port 220 so that the brake oil of the remote reservoir tank 200 is transmitted to the main reservoir tank 100. This connection member 300 may be formed of a rubber hose to easily transmit the brake oil even if the installation position of the remote reservoir tank 200 or the main reservoir tank 100 is selectively changed.

A guide wall 240 may be provided in the remote reservoir tank 200 so as to increase the flow resistance of the brake oil guided to the second connection port 220. The guide wall 240 may vertically extend from the bottom surface of the remote reservoir tank 200.

More specifically, the guide wall 240 may include a first guide separation wall 241 formed in a direction corresponding to the longitudinal direction of the second connection port 220, and a second guide separation wall 242 provided between the first guide separation wall 241 and the inner wall of the remote reservoir tank 200 in a direction perpendicular to the first guide separation wall 241.

The first guide separation wall 241 may be provided in a pair and may be arranged to be spaced apart from each other by a certain distance. In this case, the second connection port 220 may be provided to be biased in one direction of the remote lower body 202 so that the brake oil is not easily discharged to the second connection port 220 through the space between the first guide separation walls 241.

The second guide separation wall 242 may be provided in plural and arranged in a zigzag shape. That is, the second guide separation wall 242 may have one end extending to the inner wall when the other end is fixed to the first guide separation wall 241, and one end extending to the first guide separation wall 241 when the other end is fixed to the inner wall. Accordingly, the brake oil may be allowed to flow in a zigzag shape along the second guide separation wall 242.

Meanwhile, a flow hole 243 may be formed in the first guide separation wall 241 to allow the flow of the brake oil stored between the first guide separation wall 241 and the inner wall of the remote reservoir tank 200. This is because the brake oil between the first guide separation wall 241 and the inner wall is provided while being trapped. Accordingly, the brake oil between the first guide separation wall 241 and the inner wall flows to the second connection port 220 through the flow hole 243 in a state in which the flow resistance is increased by the second guide separation wall 242. Accordingly, the brake oil in the remote reservoir tank 200 is prevented from being rapidly discharged to the second connection port 220, and thus it is possible to prevent air from being introduced thereto.

Meanwhile, the bottom surface of the remote reservoir tank 200 may be provided with a flat section A and an inclined section B. In this case, the guide wall 240 may be disposed in the flat section A. Accordingly, the inclined section B may be provided to be inclined so that the brake oil flows to the flat section A. Therefore, it is possible to easily guide the brake oil toward the second connection port 220 formed in the flat section A and increase the oil flow resistance through the guide wall 240 formed in the flat section A.

In addition, the remote reservoir tank 200 according to the embodiment of the present invention has been illustrated and described as having a pair of first guide separation walls 241 provided therein, but the present disclosure is not limited thereto, and one first guide separation wall may be provided. Such an embodiment is illustrated in FIG. 10.

Figure 10:
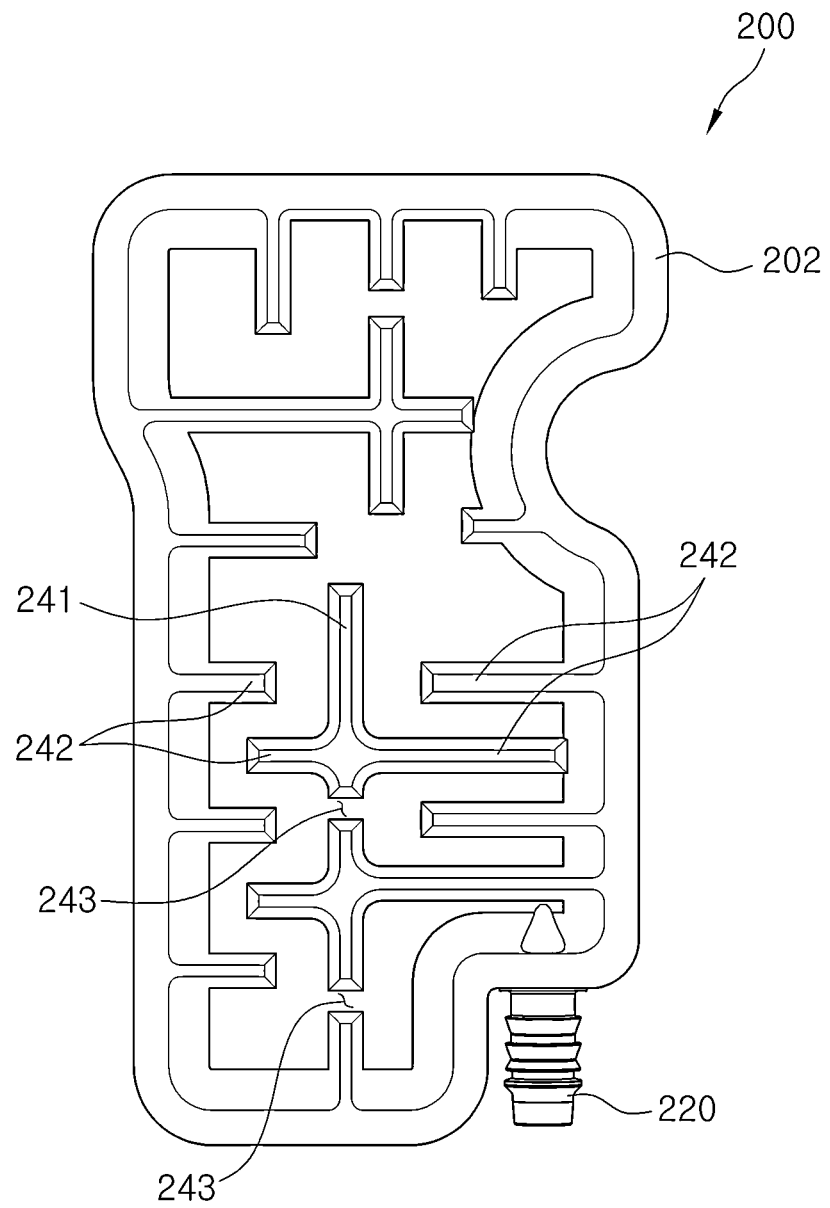
FIG. 10 is a plan view illustrating the inside of a remote reservoir tank of a front mounted-type reservoir assembly according to another embodiment of the present disclosure.

FIG. 10 is a plan view illustrating the inside of a remote reservoir tank of a front mounted-type reservoir assembly according to another embodiment of the present disclosure. Here, the same reference numerals as in the above-described embodiment refer to members having the same function.

Referring to FIG. 10, a remote reservoir tank 200 according to the current embodiment may be configured in the same manner as the above-described remote reservoir tank 200 except that a first guide separation wall 241 is provided as one.

The first guide separation wall 241 may extend in a direction corresponding to the longitudinal direction of a second connection port 220, and may vertically extend from a bottom surface of the remote reservoir tank 200. A plurality of second guide separation walls 242 may be provided in a zigzag shape on both sides of this first guide separation wall 241. In this case, a flow hole 245 may be formed in the first guide separation wall 241 so that the brake oil may flow to the second connection port 220 through the second guide separation wall 242. The flow hole 245 not only allows remote reservoir chambers 120 on both sides to communicate with each other with respect to the first guide separation wall 241, but also allows the brake oil having increased flow resistance by the second guide separation wall 242 to flow to the second connection port 220.

The front mounted-type reservoir assembly according to an embodiment of the present disclosure may provide divided reservoirs and have the reservoirs installed on the front of the integrated dynamic brake system, thereby facilitating installation in a limited space.

The front mounted-type reservoir assembly according to an embodiment of the present disclosure may provide separation walls in the reservoir chamber connected to the oil ports through which air is exposed to increase flow resistance, thereby preventing air from flowing into the brake system.

The front mounted-type reservoir assembly according to an embodiment of the present disclosure may prevent air from flowing into the brake system through the oil ports, thereby preventing the deterioration in a sense of pedaling and the brake performance.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A front mounted-type reservoir assembly installed on a front surface of a hydraulic block of an integrated dynamic brake system comprising a main reservoir tank that is provided with:
    a main reservoir chamber configured to store brake oil therein; and
    a plurality of oil ports, through which the brake oil flows in and out, on a front surface of the main reservoir tank,
    wherein at least one partition wall is provided in the main reservoir tank to partition the main reservoir chamber into a plurality of regions, and
    at least one separation wall is provided in at least one of the plurality of partitioned reservoir chambers to increase flow resistance of the brake oil,
    wherein the plurality of oil ports is provided to be connected to the plurality of partitioned reservoir chambers, respectively,
    the partition wall vertically extends from the bottom surface of the main reservoir tank, and
    an opening is formed in a certain portion of the partition wall.

2. The front mounted-type reservoir assembly of claim 1, wherein the separation wall is provided in plural and arranged in a zigzag shape.

3. The front mounted-type reservoir assembly of claim 1, wherein the separation wall comprises:
    a first separation wall having one end fixed to an inner wall of the main reservoir tank and the other end extending to the partition wall; and a second separation wall having one end fixed to the partition wall and the other end extending to the inner wall, wherein the first separation wall and the second separation wall allow the brake oil to be guided along the first separation wall and the second separation wall in a zigzag shape and to flow to the oil ports.

4. The front mounted-type reservoir assembly of claim 3, wherein the first separation wall and the second separation wall are each provided in plural.

5. The front mounted-type reservoir assembly of claim 3, wherein the first separation wall and the second separation wall vertically extend from a bottom surface of the main reservoir tank.

6. The front mounted-type reservoir assembly of claim 1, wherein the partition wall comprises a first partition wall and a second partition wall which are provided to be spaced apart from each other by a certain distance, the main reservoir chamber comprises a first main reservoir chamber formed between an inner wall of the main reservoir tank and the first partition wall, a second main reservoir chamber formed between the inner wall of the main reservoir tank and the second partition wall, and a third main reservoir chamber formed between the first partition wall and the second partition wall, and the plurality of oil ports comprise a first oil port configured to communicate with the first main reservoir chamber, a second oil port configured to communicate with the second main reservoir chamber, and a third oil port configured to communicate with the third main reservoir chamber.

7. The front mounted-type reservoir assembly of claim 1, wherein:

the opening vertically extends to communicate with the neighboring main reservoir chamber; and a lower side of the opening is provided to prevent the brake oil stored in each of the main reservoir chambers from moving to the neighboring main reservoir chambers.

8. The front mounted-type reservoir assembly of claim 1, further comprising a float that moves up and down according to the level of the brake oil to measure a residual flow rate of the brake oil stored in the main reservoir chamber, and a float guide configured to guide the up and down movement of the float.

9. The front mounted-type reservoir assembly of claim 8, further comprising an oil detector provided below the float.

10. The front mounted-type reservoir assembly of claim 1, wherein a first connection port is provided in the main reservoir tank to receive the brake oil.

11. The front mounted-type reservoir assembly of claim 10, further comprising:

a remote reservoir tank provided with an oil inlet for introducing the brake oil, a second connection port for supplying the brake oil to the main reservoir tank, and a remote reservoir chamber configured to store the brake oil therein; and a connection member configured to connect the first connection port and the second connection port to transmit the brake oil in the remote reservoir tank to the main reservoir chamber.

12. The front mounted-type reservoir assembly of claim 11, wherein a guide wall is provided in the remote reservoir tank to increase the flow resistance of the brake oil guided to the second connection port.

13. The front mounted-type reservoir assembly of claim 12, wherein the guide wall vertically extends from a bottom surface of the remote reservoir tank.

14. The front mounted-type reservoir assembly of claim 12, wherein the guide wall comprises:

a first guide separation wall formed in a direction corresponding to a longitudinal direction of the second connection port; and a second guide separation wall provided between the first guide separation wall and an inner wall of the remote reservoir tank in a direction perpendicular to the first guide separation wall.

15. The front mounted-type reservoir assembly of claim 14, wherein the first guide separation wall is provided in a pair and arranged to be spaced apart from each other by a certain distance, and the second guide separation wall is provided in plural and arranged in a zigzag shape.

16. The front mounted-type reservoir assembly of claim 15, wherein the second guide separation wall has one end extending to the inner wall in the case of the other end fixed to the first guide separation wall, has one end extending to the first guide separation wall in the case of the other end fixed to the inner wall, and allows the brake oil to flow in a zigzag shape along the second guide separation wall.

17. The front mounted-type reservoir assembly of claim 14, wherein a flow hole is formed in the first guide separation wall to allow a flow of the brake oil stored between the first guide separation wall and the inner wall.

18. The front mounted-type reservoir assembly of claim 12, wherein the bottom surface of the remote reservoir tank is provided with a flat section and an inclined section, wherein the inclined section is provided to be inclined so that the brake oil flows to the flat section, and the guide wall is disposed in the flat section.

* * * * *